(12) United States Patent
Narwade et al.

(10) Patent No.: US 12,393,754 B2
(45) Date of Patent: Aug. 19, 2025

(54) GENERATING A REDUCED BLOCK MODEL VIEW ON-THE-FLY

(71) Applicant: Synopsys, Inc., Mountain View, CA (US)

(72) Inventors: Mahantesh D. Narwade, Bangalore (IN); Soumen Ghosh, Pleasanton, CA (US); Mark Roizman, Haifa (IL); Vijaya V. Varkey, Aluva (IN); Abhinav Singla, Greater Noida (IN); Rajarshi Mukherjee, San Jose, CA (US)

(73) Assignee: SYNOPSYS, INC., Sunnyvale, CA (US)

( * ) Notice: Subject to any disclaimer, the term of this patent is extended or adjusted under 35 U.S.C. 154(b) by 767 days.

(21) Appl. No.: 17/702,146

(22) Filed: Mar. 23, 2022

(65) Prior Publication Data
US 2022/0327266 A1 Oct. 13, 2022

Related U.S. Application Data

(60) Provisional application No. 63/165,624, filed on Mar. 24, 2021.

(51) Int. Cl.
*G06F 30/327* (2020.01)

(52) U.S. Cl.
CPC .................. *G06F 30/327* (2020.01)

(58) Field of Classification Search
CPC .... G06F 30/327; G06F 30/3312; G06F 30/33; G06F 2115/02; G06F 2119/12
See application file for complete search history.

(56) References Cited

U.S. PATENT DOCUMENTS

| | | | | |
|---|---|---|---|---|
| 7,437,695 B1* | 10/2008 | Ranjan | ................. | G06F 30/3312 703/19 |
| 7,849,430 B2* | 12/2010 | Smith | ................. | G06F 30/3312 716/113 |
| 8,181,149 B1* | 5/2012 | Kelly | ................. | G06F 30/30 716/139 |
| 9,600,613 B1* | 3/2017 | Corbett | ................... | G06F 30/33 |
| 10,204,201 B1* | 2/2019 | Loh | ................. | G06F 30/33 |
| 11,443,088 B1* | 9/2022 | Verma | ................. | G06F 9/463 |
| 11,455,450 B1* | 9/2022 | Singh | ................. | G06F 30/3315 |
| 11,797,747 B1* | 10/2023 | Eaton | ................. | G06F 30/327 |
| 2002/0007261 A1* | 1/2002 | Ochi | ................. | G06F 30/33 703/14 |
| 2005/0198601 A1* | 9/2005 | Kuang | ................. | G06F 30/33 716/108 |

(Continued)

OTHER PUBLICATIONS

Ajay J. Daga, "Automated Timing Model Generation", Proceedings of the Design Automation Conference, Jun. 10, 2002, pp. 146-151.

(Continued)

*Primary Examiner* — Nha T Nguyen
(74) *Attorney, Agent, or Firm* — Laxman Sahasrabuddhe; Park, Vaughan, Fleming & Dowler LLP

(57) ABSTRACT

A word-level design model may be loaded into memory. Next, a masking layer may be created which includes objects in the word-level design model that are not used by an IC design analysis system. The masking layer may then be used to provide a reduced block model view on-the-fly to the IC design analysis system.

19 Claims, 9 Drawing Sheets

(56) References Cited

U.S. PATENT DOCUMENTS

| | | | |
|---|---|---|---|
| 2007/0129925 A1* | 6/2007 | Otsuki | G06F 30/33 |
| | | | 703/14 |
| 2012/0254818 A1* | 10/2012 | Liu | G06F 30/337 |
| | | | 716/135 |
| 2015/0121326 A1* | 4/2015 | De | G06F 30/3312 |
| | | | 716/108 |
| 2017/0344696 A1* | 11/2017 | Dai | G06F 30/33 |
| 2021/0173987 A1* | 6/2021 | Cook | G06F 30/333 |
| 2025/0008292 A1* | 1/2025 | Weber | H04S 7/305 |
| 2025/0030716 A1* | 1/2025 | Cross | H04L 63/1441 |

OTHER PUBLICATIONS

Guillaume Plassan, "Conclusively Verifying Clock-Domain Crossings in Very Large Hardware Designs", Proceedings of the IFIP/IEEE International Conference on Very Large Scale Integration, Sep. 26, 2016, pp. 1-6.

Namit Gupta, "Overcoming complex CDC violations with a concurrent block and SoC-level verification flow".

* cited by examiner

GENERATING A REDUCED BLOCK MODEL VIEW ON-THE-FLY

RELATED APPLICATION

This application claims the benefit of U.S. Provisional Application Ser. No. 63/165,624, filed on 24 Mar. 2021, the contents of which are herein incorporated by reference in their entirety for all purposes.

TECHNICAL FIELD

The present disclosure relates to an electronic design automation (EDA) system. More specifically, the present disclosure relates to a system and method for generating a reduced block model view on-the-fly.

BACKGROUND

Advances in process technology and an increasing demand for computing and storage have fueled an increase in the size and complexity of IC designs. It is desirable to improve the performance and capacity of IC design tools that are used to analyze and debug large and complex IC designs.

SUMMARY

Embodiments described herein may feature generating a reduced block model view on-the-fly to an IC design analysis system. Examples of IC design analysis systems include, but are not limited to, a clock-domain-crossing (CDC) analysis system, a reset-domain-crossing (RDC) analysis system, a low-power (LP) analysis system, or a structural analysis system. A word-level design model may be loaded into memory. Next, a masking layer may be created which includes objects in the word-level design model that are not used by the IC design analysis system. The masking layer may then be used to provide a reduced block model view on-the-fly to the IC design analysis system.

In some embodiments described herein, a request for connectivity information in the word-level design model may be received from the IC design analysis system. Next, the connectivity information may be determined based on the word-level design model and the masking layer. The connectivity information may then be provided to the IC design analysis system.

In some embodiments described herein, the masking layer may be created by first identifying a subset of objects in the word-level design model by performing word-level traversals from input and output ports, and then adding objects that are not in the subset of objects to the masking layer.

In some embodiments described herein, performing word-level traversals from input and output ports may include identifying objects in a path from a port to a first level sequential register.

In some embodiments described herein, performing word-level traversals from input and output ports may include selecting a first port connected to a first CDC synchronization circuit and a second port connected to a second CDC synchronization circuit. Next, objects in a first path from the first port and a second path from the second port that converge at a sequential register may be identified.

In some embodiments described herein, identifying the subset of objects in the word-level design model may include identifying objects in different blocks of the word level design model in parallel, and then aggregating the objects identified in the different blocks of the word level design model. In some embodiments described herein, the IC design may be a system on a chip (SoC) design, the reduced block model view may correspond to a top-level view in the SoC design, and the different blocks of the word-level design model may correspond to different blocks in the top-level view of the SoC design.

BRIEF DESCRIPTION OF THE FIGURES

The disclosure can be understood based on the detailed description given below and the accompanying figures. The figures are for illustrative purposes, and do not limit the scope of the disclosure. Furthermore, the figures are not necessarily drawn to scale.

DETAILED DESCRIPTION

Figure 1:
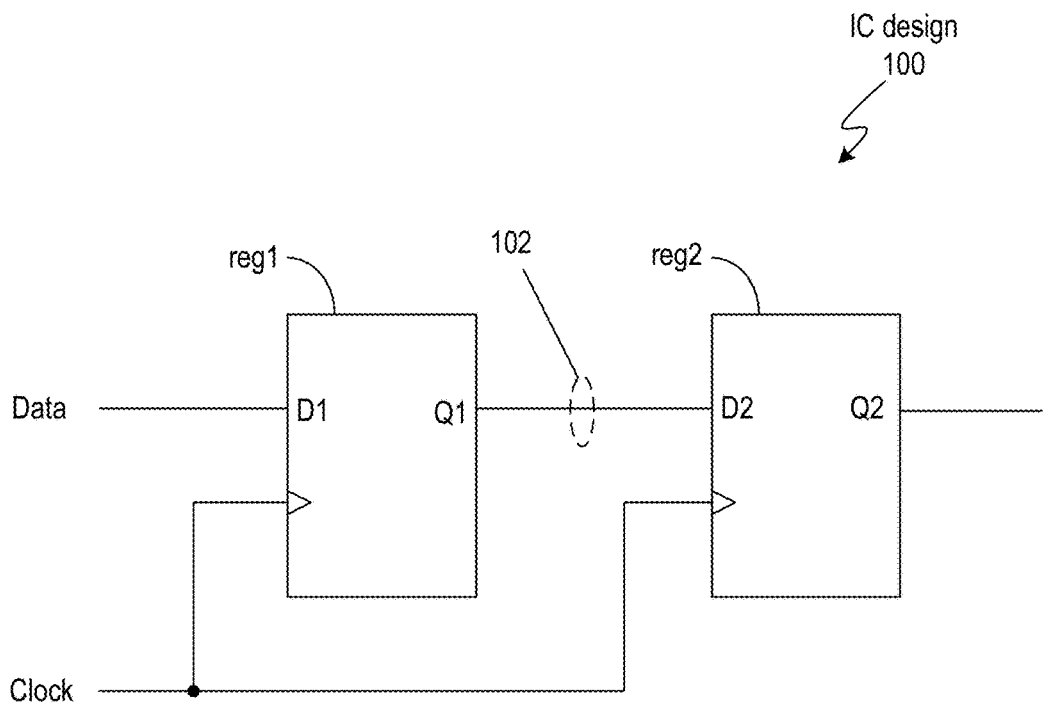
FIG. 1 illustrates a word-level data model of an IC design in accordance with some embodiments described herein.

In a hierarchical design methodology, an IC block that has multiple instantiations may be described once, and the multiple instantiations in the IC design may refer to the single IC block description. In a flattened design, the full description of an IC block may be duplicated for each instantiation. Performing sign-off on a flattened SoC design may be computationally very costly or even infeasible. Therefore, during sign-off, a hierarchical design methodology may be adopted. Using a hierarchical design methodology may also help users with significant improvement in the turn-around-time (TAT).

In a typical hierarchical design methodology, the system may define lower level, smaller, independent design units (also known as IC blocks) and may perform optimization and/or verification to achieve the desired design goals at the IC block level. Next, the system may generate a representative (reduced) block model for each IC block to replace its full logic view when optimization and/or verification is performed at a higher level in the hierarchy (e.g., at the top level of the design). These reduced block models are much smaller in size (e.g., they use less storage space) than a full IC block model because the reduced block models may contain only the information that is necessary for performing IC design operations at the higher hierarchy levels.

The reduced block models may be manually generated by the users responsible for designing the IC blocks. A user may forget to generate a reduced model or may delay generating a reduced model, which may cause extra iterations of the design flow and increase the amount of time used for signing-off an IC design. Additionally, changes in design constraints may create inconsistencies between the reduced block models and the actual models that are desired to be used during sign-off, which may lead to additional iterations of the design flow. As an example, consider a parameterized block. Different parameter combinations in which the parameterized block is instantiated in the IC design may not be known to the user who is generating the reduced block model. As a result, the generated reduced block models may not cover all the parameter combinations that are used for sign-off at the top level.

Thus, challenges of typical approaches for generating reduced block models include, but are not limited to, (1) heavy dependency on IC block teams for generating reduced models, (2) manual reduced block model generation which may be error-prone and may use a large amount of time, (3) block level design team may need to generate block reduced models during block level verification, (4) reduced block models may be generated based on block constraints and assumptions, which may change over time, (5) any differences between the assumptions at the block level and the SoC level may cause additional iterations and time, (6) for third-party vendor intellectual property (IP) blocks that provide limited access to the design, the amount of time required to obtain the correct reduced block model from the third-party could be high, (7) reduced block models may need to be generated for parameterized blocks, and (8) for parameterized blocks, additional iterations may be used for generating reduced block models for all parameter combinations used at the SoC level.

With growing SoC design size and complexity, it may take a large amount of time to perform sign-off because the generated reduced block models are incorrect and/or incomplete. Moreover, if a reduced block model for an IC block is unavailable or incomplete, an IC design analysis system may not be able to perform the analysis. Such an IC design analysis system includes static verification (e.g., CDC verification). Therefore, there is a need for systems and techniques to generate reduced block models.

Some embodiments described herein may dynamically identify and mask block design content that does not influence an analysis outcome of an IC design analysis system that is used during sign-off, thereby preventing the masked content from being unnecessarily analyzed during analysis. In embodiments described herein, creation of reduced block models may be performed on-the-fly during a top-level run to achieve zero/minimal data exchange dependency between block level and top-level SoC design teams. Embodiments described herein address both the missing reduced block model issue as well as challenges caused by inconsistent reduced block models. In some embodiments, block model reduction may be achieved by analyzing logic content of block instances and identifying logic elements which do not impact outcomes of an IC design analysis system.

Advantages and features of embodiments described herein include, but are not limited to, (1) improving the quality and performance of IC design systems during sign-off, (2) reducing the amount of time spent for sign-off (because time is not spent on manually generating missing or incomplete reduced block models), (3) dynamically reducing block design content on-the-fly by masking out irrelevant logic for SoC level analysis, (4) no dependency on block level runs (because on-the-fly logic reduction creates reduced block models in-memory by masking design elements from being seen by the IC design system), (5) no disk read/write operations (unlike other techniques that require writing and linking of reduced block models), (6) block reduction is performed as part of SoC run using final SoC constraints that are targeted for sign-off, (7) differences in constraint setups between the block level and the SoC level do not prevent SoC sign-off, (8) block reduction may be used to analyze only blocks instances for which models are missing (e.g., for parameterized IP/blocks instances with parameter combinations having no block model generated at block level run), and (9) optional operations may be performed to further optimize the reduced blocks (e.g., the full block design may be used during the block run along with necessary object sets to guide the block reduction for the SoC level run, and during the SoC run the full design model may be linked directly to save compile/elaboration time for loading the SoC design; moreover, objects set saved during block run may be used to guide and speed up logic reduction, and capability may be added to save reduced block instances as models to be used for subsequent SoC run without any design and constraint changes).

The term reduced block model may refer to objects (e.g., combinational gates and/or sequential registers) in a current design scope that are used for performing a given analysis. The objects that are included in a reduced block model may depend on the IC design analysis system. For example, timing paths between registers that are clocked by the same clock source can be ignored (i.e., masked) for purposes of a CDC analysis system. Thus, a reduced block model for a CDC analysis system may not include such ignored objects. For an RDC analysis system, a reset signal that does not cross any clock domain boundary may be ignored. For an LP analysis system, logic that is not used for determining the power mode may be ignored. For Lint checks, objects that are not used for checking a set of rules (e.g., a width matching rule which ensures that the width of the two variables in an assignment statement are equal) may be ignored. The term "masked object" may refer to an object which is ignored or masked from an IC design analysis system.

FIG. 1 illustrates a word-level data model of an IC design in accordance with some embodiments described herein.

IC design 100 is a word-level data model that includes registers reg1 and reg2. Objects in a word-level data model can represent an entire word of data as opposed to a single bit. For example, input port D1 of reg1 may represent a word, e.g., 256 bits. Likewise, ports Q1, D2, and Q2 also represent 256 bits each. The number of objects in a word-level signal path may increase substantially (e.g., 256×) when the signal path is bit-blasted. The term bit-blasted refers to creating a separate signal and/or circuitry for each bit in a word. For example, if IC design 100 is bit-blasted, register reg1 may be replaced by 256 sequential elements, and reg2 may be replaced by 256 sequential elements (which may be referred to as reg1[0], reg1[1], . . . , reg1[255], reg2[0], . . . , reg2[255]). Additionally, signal path 102 may be replaced by 256 distinct signal paths between a bit in reg1 and a bit in reg2.

Some embodiments described herein use a word-level data model in which objects (e.g., register reg1 or reg2) may have a word-level width (e.g., registers reg1 or reg2 may have a width of 256), and one word-level signal path may be used to represent multiple bits. Embodiments described herein allow word-level traversal on a word-level design model. A word-level traversal can be significantly faster than a bit-level traversal. The term word-level design model may refer to a word-level data model of an entire IC design.

Figure 2:
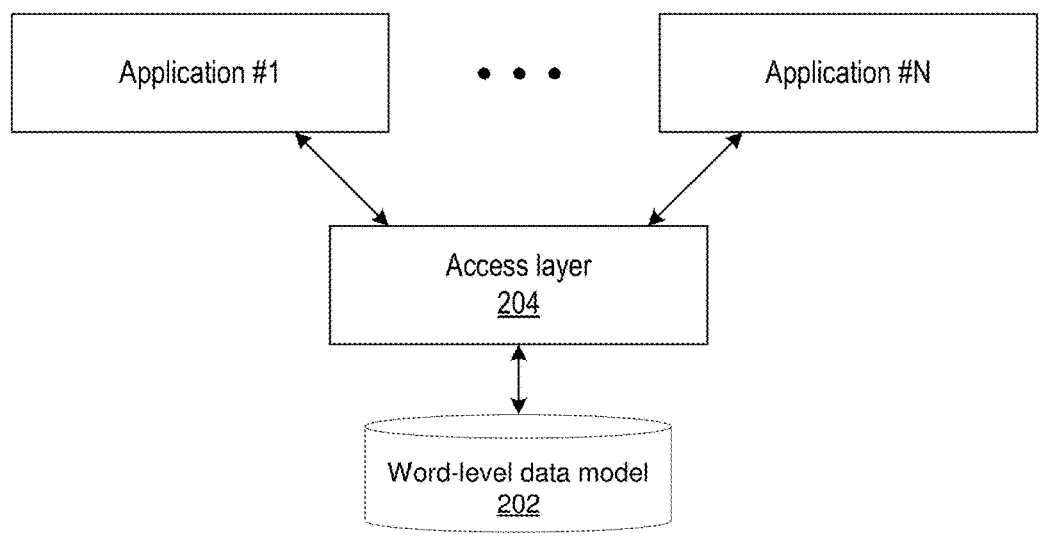
FIG. 2 illustrates an access layer that provides access to a word-level data model of an IC design in accordance with some embodiments described herein.

FIG. 2 illustrates an access layer that provides access to a word-level data model of an IC design in accordance with some embodiments described herein.

Some embodiments may be implemented as access layer 204 which provides access to word-level data model 202 of an IC design. Applications #1 through #N may access word-level data model 202 through access layer 204. Examples of applications include, but are not limited to, CDC analysis systems, RDC analysis systems, LP analysis systems, and Lint analysis systems.

Access layer 204 may generate reduced block models on-the-fly for applications #1 through #N. Access layer 204 may generate the reduced block models when an application attempts to access word-level data model 202. Access layer 204 may be implemented by a set of instructions stored on a storage medium which are executed by a processor. In some embodiments, access layer 204 may support a process/thread-safe analysis infrastructure. Specifically, access layer 204 supports a process/thread-safe analysis structure because access layer 204 may provide simultaneous access to applications #1 through #N which may execute in different processes and/or threads in parallel and simultaneously analyze the same word-level data model 202, which may be stored in a storage medium (e.g., memory or disk). Access layer 204 may provide an application programming interface to applications #1 through #N. The application programming interface may be used to invoke a set of access routines, which may include, but are not limited to, query and traversal routines. The routines may return results based on reduced block models that are generated on-the-fly.

Specifically, access layer 204 may ignore design objects that are marked to be ignored. In other words, access layer 204 may use a non-destructive mechanism (i.e., a mechanism that does not modify the underlying data model) to remove visibility of objects that are not in the reduced block model. Specifically, instead of removing objects from word-level data model 202, access layer 204 may apply a masking layer on word-level data model 202. Applications #1 through #N may not directly access the design objects in word-level data model 202 and may only access those design objects that are visible through the mask layer. In other words, the masked-out objects in word-level data model 202 are not visible to applications #1 through #N, which reduces the number of objects processed by the applications.

Figure 3A:
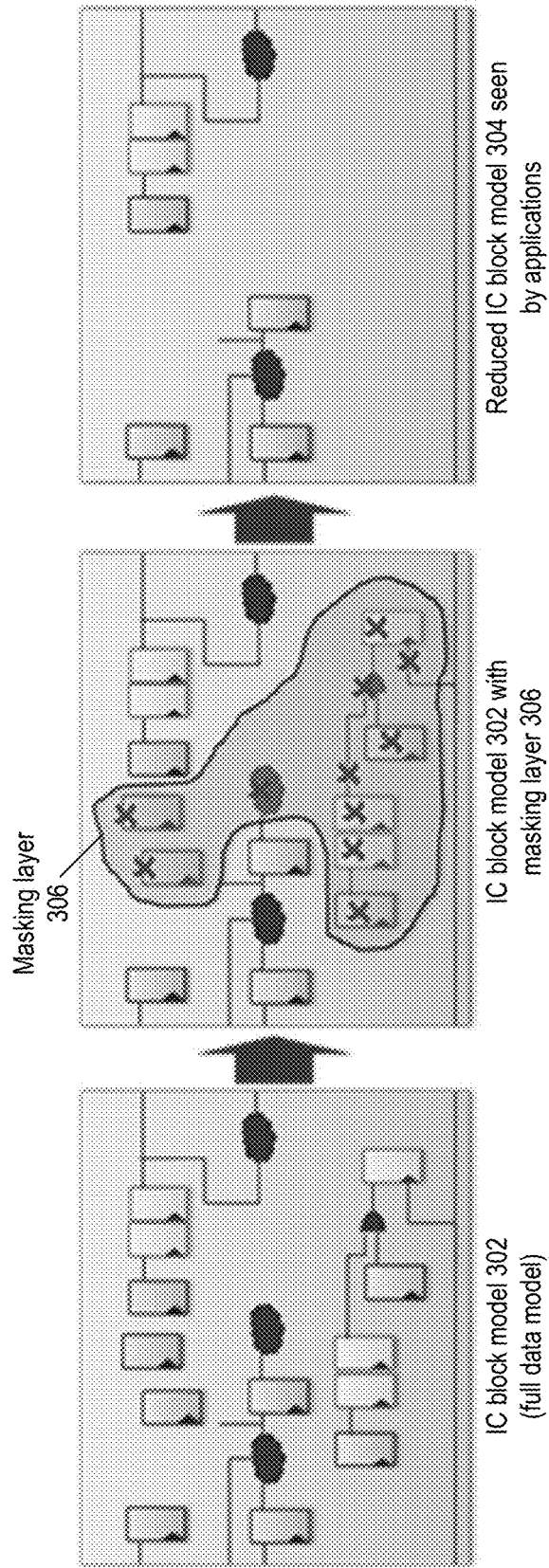
FIG. 3A illustrates on-the-fly block reduction in accordance with some embodiments described herein.

FIG. 3A illustrates on-the-fly block reduction in accordance with some embodiments described herein.

IC block model 302 may include full logic details of an IC block. Masking layer 306 may be used to mask a set of objects in IC block model 302. Reduced IC block model 304 that is seen by applications may include objects in IC block model 302 that were not masked. For example, IC block model 302 may correspond to word-level data model 202 in FIG. 2 and access layer 204 in FIG. 2 may apply masking layer 306 to IC block model 302, thereby causing reduced IC block model 304 to be seen by applications #1 through #N in FIG. 2.

Figure 3B:
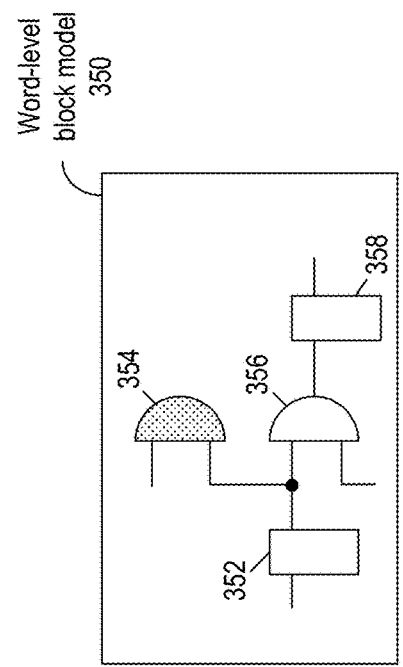
FIG. 3B illustrates on-the-fly block reduction in accordance with some embodiments described herein.

FIG. 3B illustrates on-the-fly block reduction in accordance with some embodiments described herein.

Word-level block model 350 may include registers 352 and 358, and gates 354 and 356. The term word-level block model may refer to a word-level data model for an IC block. Each connection in FIG. 3B may represent a word, e.g., 256 bits. Gate 354 may be marked as "to be ignored" by an access layer (e.g., access layer 204 in FIG. 2). For example, an ignore flag associated with gate 354 in IC block model 350 may be set to TRUE to indicate that gate 354 is to be ignored.

Applications (e.g., applications #1 through #N) may access data from a word-level block model by using requests or queries. For example, an application may request the netlist for an IC block or may request all objects that are connected to a given port. Requests or queries made by an application may be serviced by the access layer. The access layer may provide a response to the application based on a reduced block model that is generated on-the-fly. For example, if an application requests the netlist of word-level block model 350, the access layer may respond with a netlist that includes registers 352 and 358, and gate 356. The access layer may not include gate 354 in the response because gate 354 has been marked as "to be ignored." Likewise, if an application queries the objects that are connected to the output port of register 352, the access layer may provide a response that includes gate 356 but does not include gate 354 because gate 354 has been marked as "to be ignored."

Embodiments described herein may be used by static sign-off systems. A static sign-off system may identify problems in a design without simulating the design. Examples of sign-off operations that may be performed using a static sign-off system may include, but are not limited to, CDC verification sign-off, RDC verification sign-off, and LP verification sign-off. In CDC verification sign-off, the static sign-off system may analyze the design to identify problems in CDC circuitry. In RDC verification sign-off, the static sign-off system may analyze the design to identify problems in RDC circuitry. In LP verification sign-off, the static sign-off system may analyze the design to identify problems in LP circuitry.

Figure 4:
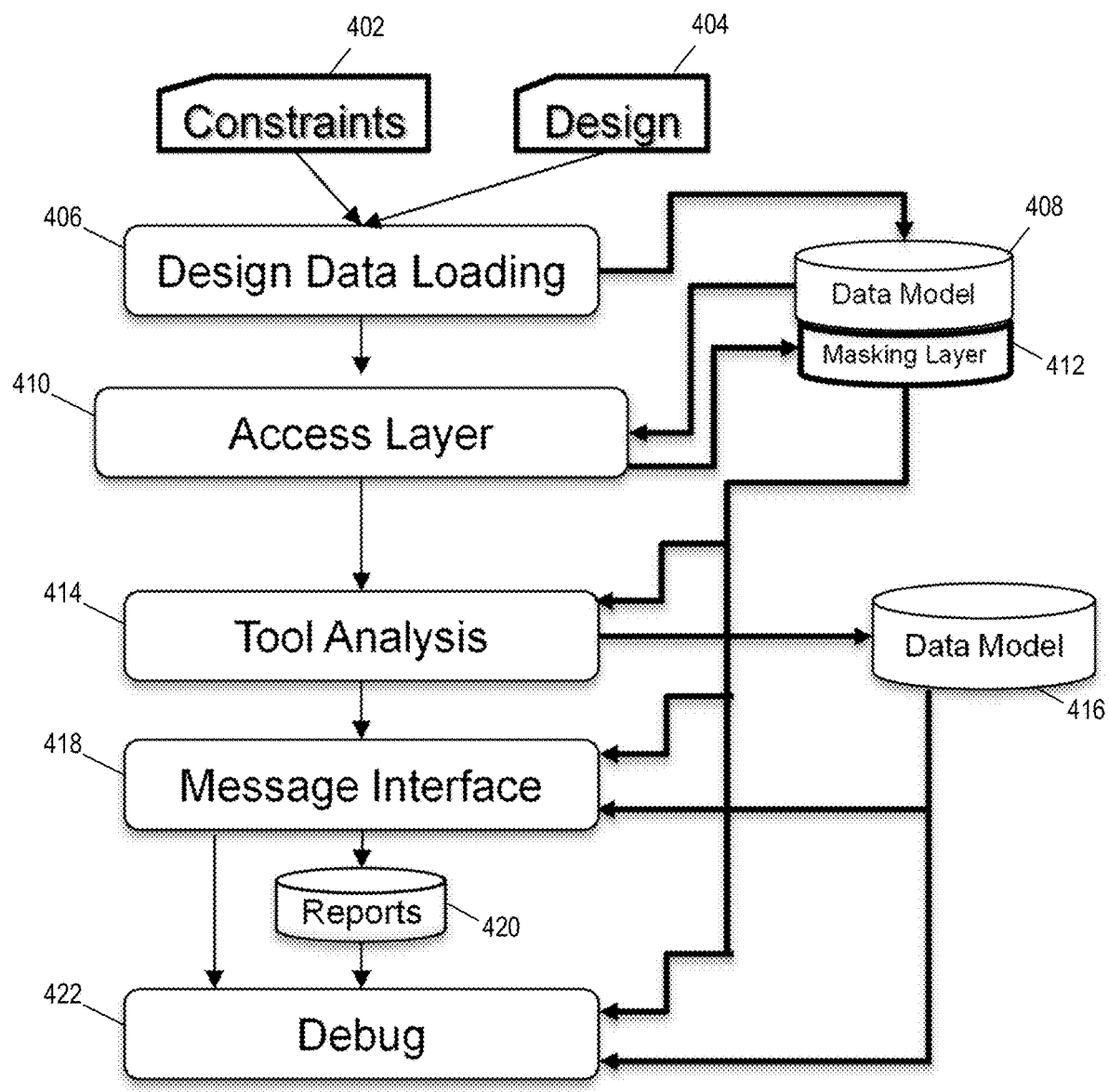
FIG. 4 illustrates a design flow that uses on-the-fly block reduction in accordance with some embodiments described herein.

FIG. 4 illustrates a design flow that uses on-the-fly block reduction in accordance with some embodiments described herein. Constraints 402 and IC design 404 may be loaded into memory by design data loading module 406 and stored as a word-level data model 408. Design data loading module 406 may be implemented by a set of instructions stored on a storage medium which are executed by a processor. Constraints 402 may include, but are not limited to, parameter values for different block instances in IC design 404. Access layer 410 may generate masking layer 412 based on processing word-level data model 408. Tool analysis 414 may then be performed on design 404. Specifically, tool analysis 414 may access word-level data model 408 through masking layer 412, which may present a reduced block model to the analysis tool. The results of tool analysis 414 may be stored in data model 416, and provided to message interface 418, which may generate reports 420. Debug tool 422 may use reports 420 to perform debugging operations.

Figure 5:
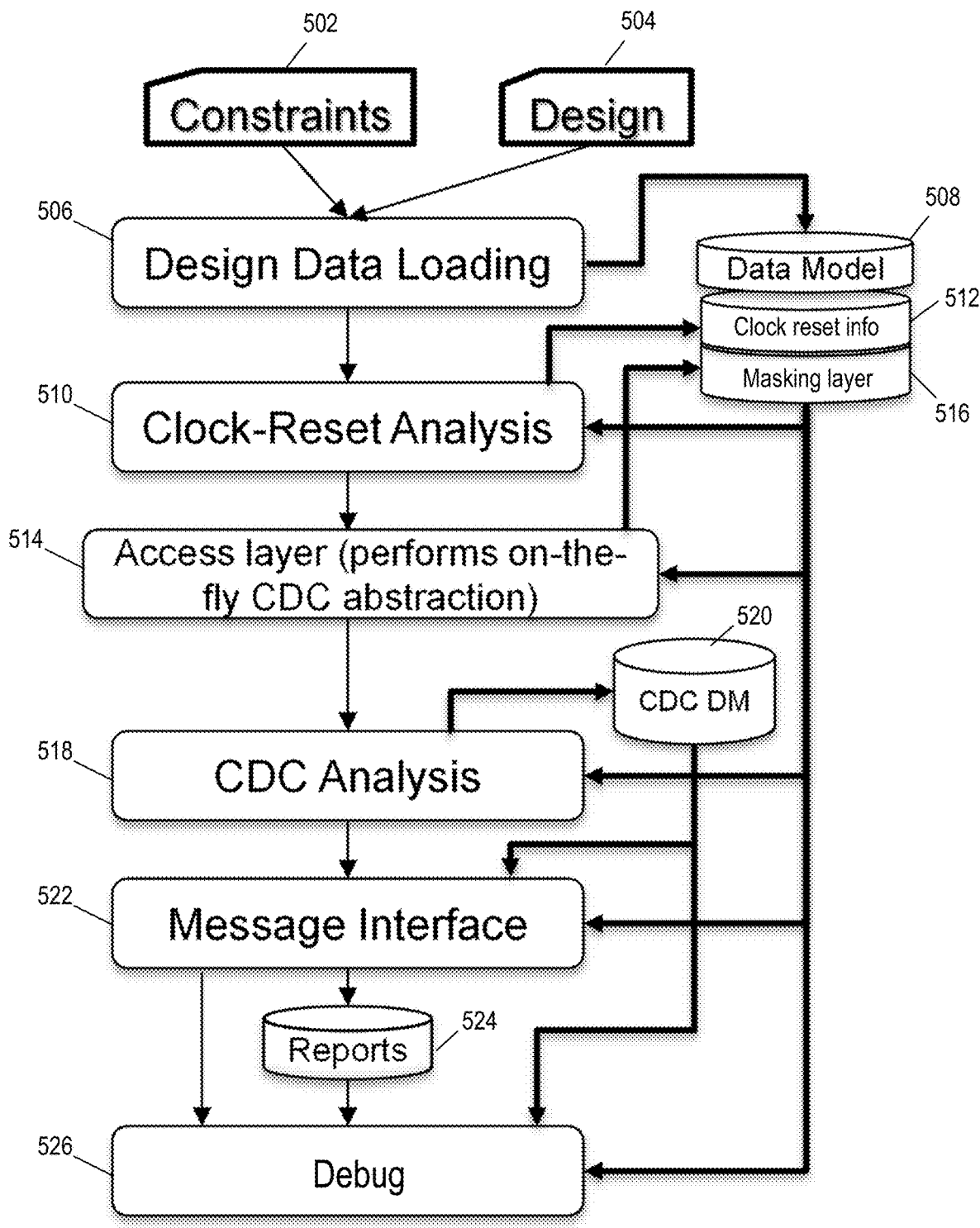
FIG. 5 illustrates a design flow that uses on-the-fly block reduction in accordance with some embodiments described herein.

FIG. 5 illustrates a design flow that uses on-the-fly block reduction in accordance with some embodiments described herein.

Constraints 502 and IC design 504 may be loaded into memory by design data loading module 506 and stored as a word-level data model 508. Clock-reset analysis 510 may be performed on word-level data model 508 and the clock reset information 512 may be stored. Next, access layer 514 may generate masking layer 516 based on processing word-level data model 508 and clock reset information 512. Clock-reset analysis 510 may check the synchronization of reset signals that cross clock domains, and clock-reset information 512 may include information about reset signals and/or logic associated with reset signals that cross clock domains. CDC analysis 518 may then be performed on design 504. Specifically, CDC analysis 518 may access word-level data model 508 through masking layer 516, which may present a reduced block model to the CDC analysis 518. The results of CDC analysis 518 may be stored in CDC data model 520, and provided to message interface 522, which may generate reports 524. Debug tool 526 may use reports 524 to perform debugging operations.

Figure 6:
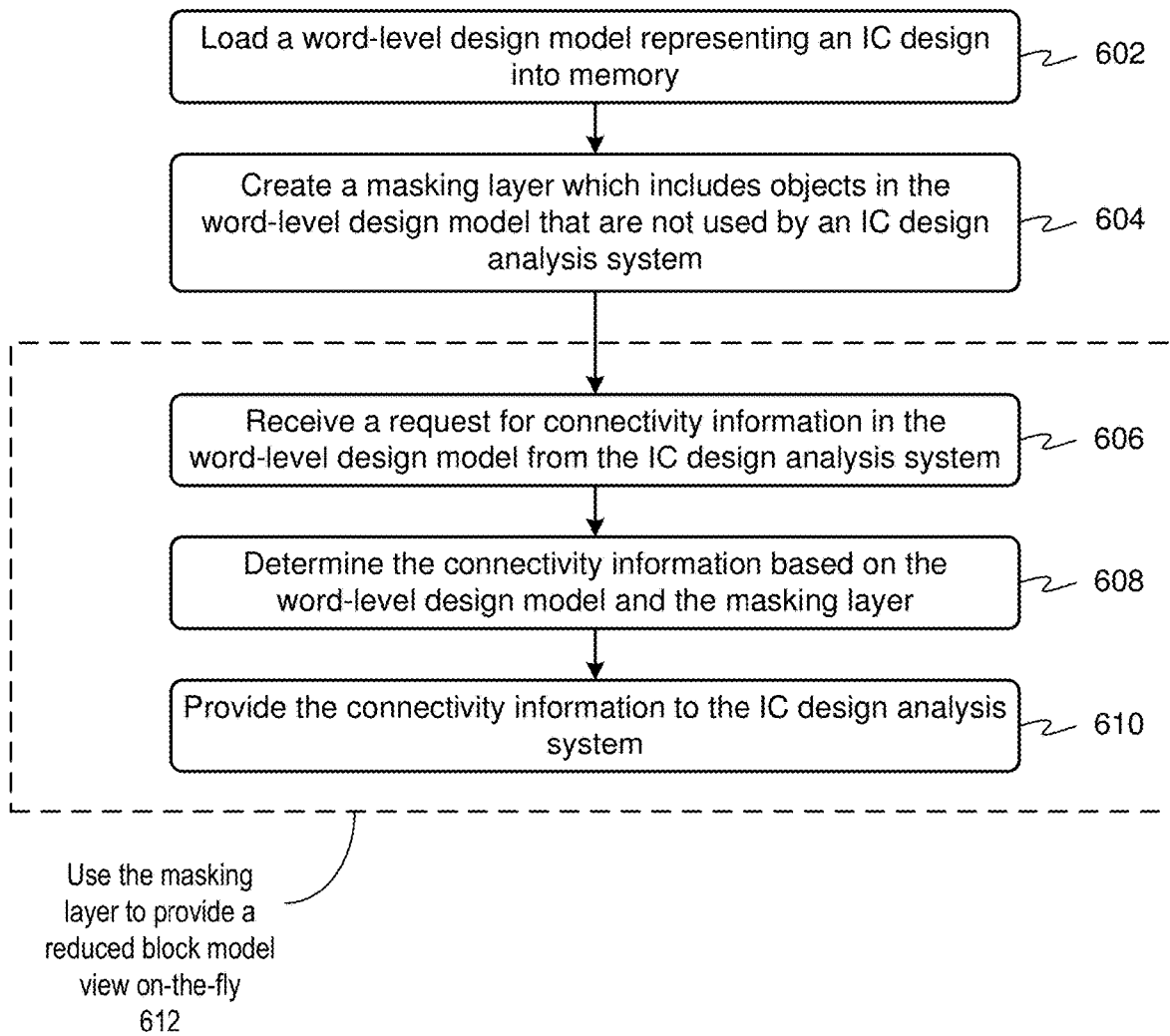
FIG. 6 illustrates a process for providing a reduced block model view in accordance with some embodiments described herein.

FIG. 6 illustrates a process for providing a reduced block model view in accordance with some embodiments described herein. A word-level design model representing an IC design may be loaded into memory (at 602). The word-level design model may include the full design data and optionally metadata that is used by a given IC design analysis system. For example, for a CDC analysis system, the metadata may include CDC specific metadata which may include, but is not limited to, a set of input ports that are connected to synchronization circuitry. The metadata may be used for on-the-fly block reduction.

Next, a masking layer may be created which includes objects in the word-level block model that are not used by an IC design analysis system (at 604). For example, each IC design analysis system may use a subset of objects when performing the analysis. Specifically, a set of rules may be defined to identify the subset of objects that are used by a given IC design analysis system. The subset of objects may be identified in the word-level block model, and the remaining objects in the word-level block model may be added to the masking layer. The subset of objects may be identified by performing word-level traversals from input and output ports. The extent and depth of the traversal may depend on multiple factors which may include, but are not limited to, the type of analysis for which the reduced block model is being generated, and the type of input or output port.

In a word-level traversal, each traversal operation performs a traversal hop for an entire word. For example, consider a register that stores a 256-bit word, where a first set of 128 bits (e.g., reg[0] through reg[127]) feed object B1's input and a second set of 128 bits (e.g., reg[128] through reg[255]) feed object B2's input. In this example, a single traversal operation would determine connectivity between (1) the first 128 bits of the register and object B1, and (2) the second 128 bits of the register and object B2. On the other hand, a bit-level traversal in a bit-level data model would use 256 separate traversal operations to achieve the same result. Some embodiments described herein can generate reduced word-level block models on-the-fly by using word-level traversals that are substantially faster than bit-level traversals.

Figure 7:
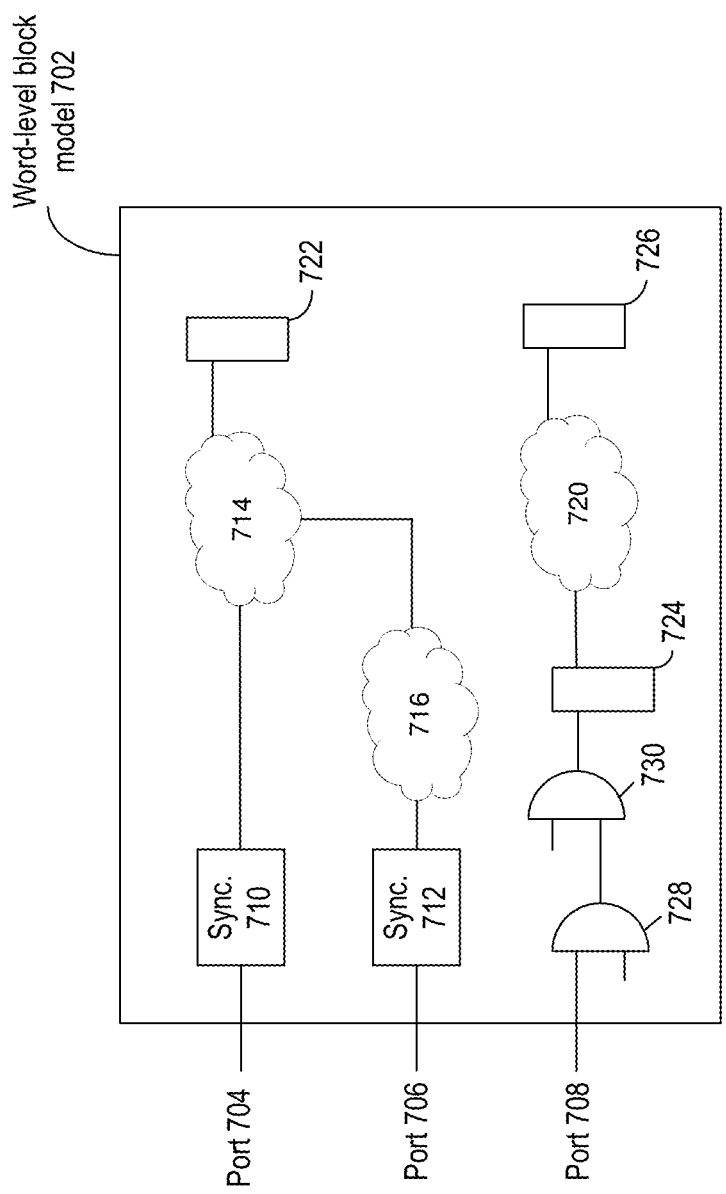
FIG. 7 illustrates word-level traversals to identify objects for analysis in accordance with some embodiments described herein.

FIG. 7 illustrates word-level traversals to identify objects for analysis in accordance with some embodiments described herein.

Word-level block model 702 may include input ports 704, 706, and 708. Each input port may receive a word of data. Data received on ports 704 and 706 may cross a clock domain boundary. For example, the data received on ports 704 and 706 may be transmitted using a clock signal that is different from the clock signal that is used for receiving the signal in word-level block model 702. Synchronization circuits 710 and 712 may be used to synchronize between the two clock domains. For example, a synchronization circuit may include two registers coupled in series, where the first register is clocked using the transmitter's clock signal and the second register is clocked using the receiver's clock signal. Word-level block model 702 may include sequential registers 722, 724, and 726, combinational gates 728 and 730, and logic clouds 714, 716, and 720. A logic cloud may generally include one or more combinational gates and/or sequential registers.

In some embodiments described herein, a word-level fanout traversal from an input port may be performed until first level sequential register objects are reached. Additionally, a word-level fanin traversal may be performed from an output port until first level sequential register objects are reached. The objects collected up till the first level sequential registers may be marked as objects that are used by an IC design analysis system (e.g., CDC analysis). For example, a word-level fanin traversal may be performed from port 708 up till sequential register 724 which is the first level sequential register. The objects collected in this word-level fanin traversal include gates 728 and 730, and sequential register 724.

A CDC analysis system may verify synchronization circuitry between two clock domains. The CDC analysis system may use objects in synchronization paths until the paths converge. In other words, the word-level traversals may not terminate upon reaching the first level sequential register for input ports that include synchronization circuits.

In some embodiments described herein, potential control path synchronizers may be identified and collected, which may include, but not limited to, the input ports and output ports of user defined synchronizer instances. Next, for each potential control path synchronizer port, a word-level fanout traversal may be performed up to a given sequential depth as specified for CDC convergence checks. Specifically, objects up till a sequential register where more than two start points converge may be collected as objects that are used in the analysis. In some embodiments described herein, a word-level fanout traversal may be performed up to a given sequential depth as specified for CDC data synchronizer checks. Specifically, objects up till a sequential register which is an unsynchronized data transfer may be collected as objects that are used in the analysis.

For example, ports 704 and 706 may be identified because these ports are coupled with synchronization circuits 710 and 712. Next, word-level fanout traversal may be performed from ports 704 and 706 until the paths converge at a sequential register. For example, paths from ports 704 and 706 converge at sequential register 722. Thus, all objects in these two paths may be collected for CDC analysis. The collected objects may include multiple levels of sequential registers. Objects that are not collected for CDC analysis may be included in the mask layer, e.g., these objects may be marked "to be ignored." The objects in the mask layer are not visible to the CDC analysis system when the CDC analysis system accesses word-level block model 702.

In some embodiments described herein, for each sequential register that has been marked, the clock and reset-tree network objects of the registers may be collected as objects that are used in the analysis.

In some embodiments described herein, block model reduction may be performed on different blocks in parallel. Specifically, an access layer (e.g., access layer 204 in FIG. 2) may perform on-the-fly block model reduction on multiple blocks in parallel.

Figure 8:
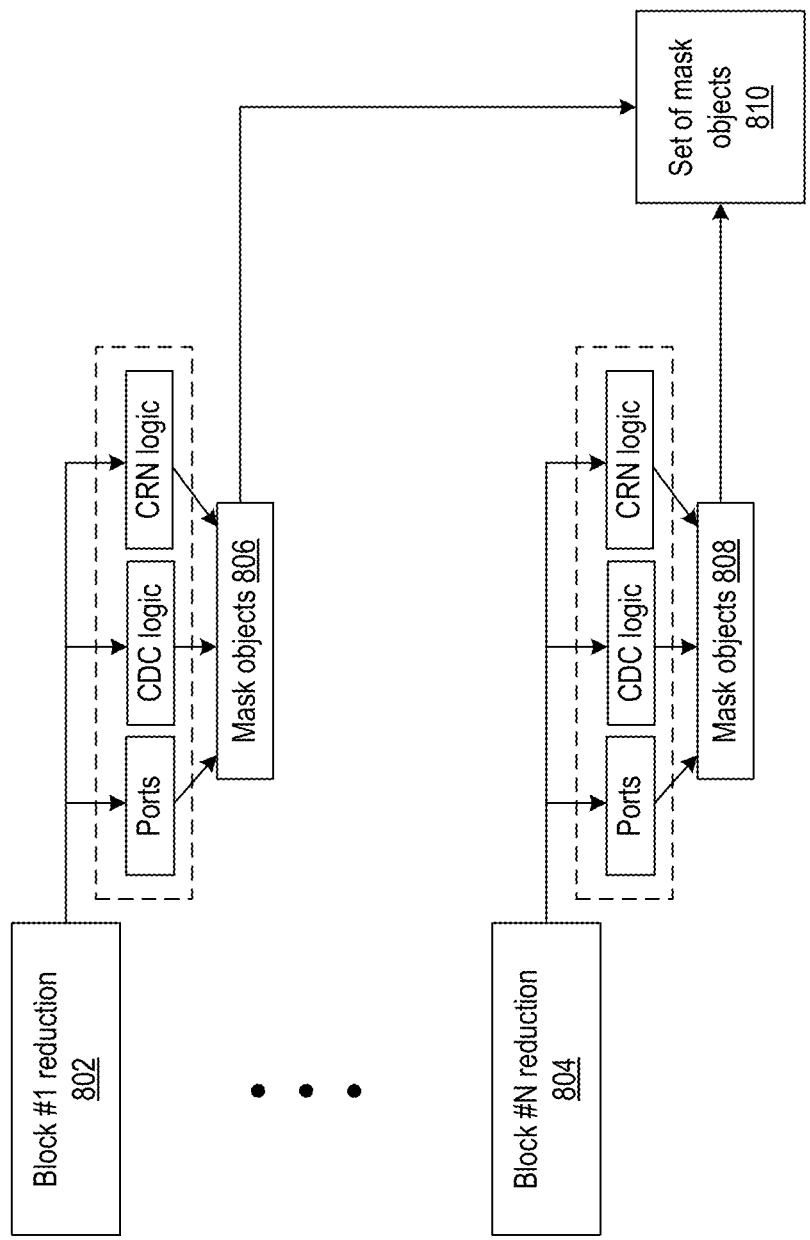
FIG. 8 illustrates a process for performing on-the-fly block model reduction in parallel in accordance with some embodiments described herein.

FIG. 8 illustrates a process for performing on-the-fly block model reduction in parallel in accordance with some embodiments described herein.

Multiple block models may be reduced in parallel by using separate processes and/or threads. For example, block #1 reduction 802 through block #N reduction 804 may be performed in parallel. In each block reduction process and/or thread, different types of objects may also be processed in parallel. For example, ports, CDC logic, and clock reset network (CRN) logic may be processed in parallel by block #1 reduction 802 to identify objects that are desired to be retained in the reduced block model. The remaining objects (i.e., the objects that are not desired to be retained in the reduced block model) may be marked "to be ignored" and may be included in mask objects 806. Likewise, each block reduction process or thread may determine mask objects in parallel. For example, block #N reduction 804 may determine mask objects 808 in parallel while block #1 reduction 802 is determining mask objects 806. Next, the mask objects from the different blocks may be combined to obtain set of mask objects 810 for the entire word-level design. Set of mask objects 810 may then be used to create a reduced block model on-the-fly.

Referring to FIG. 6, a reduced block model view may then be provided on-the-fly by using the masking layer (at 612). The reduced block model view includes objects that are not in the masking layer. The IC design analysis system can only access objects that are not in the masking layer. The term on-the-fly refers to the fact that the reduced block model view is generated when an application (e.g., an IC design analysis system) attempts to access the word-level design model. The reduced block model view may not be stored in disk; instead, the reduced block model view may be stored in memory and deleted once the IC design analysis system completes execution. Specifically, a request for connectivity information in the word-level design model may be received from the IC design analysis system (at 606). For example, a request for connectivity information at the output of register 352 in FIG. 3 may be received. Register 352 is not in the masking layer. If register 352 were in the masking layer, then register 352 would not have been visible to the IC design analysis system and the IC design analysis system would not be able to request connectivity information for the output of register 352. The connectivity information may be determined based on the word-level design model and the masking layer (at 608). For example, gate 354 may be ignored because gate 354 is in the masking layer. Thus, the connectivity information at the output of register 352 may include gate 356 but not include gate 354. Next, the connectivity information may be provided to the IC design analysis system (at 610). The IC design analysis system may not see the masked objects in the word-level design model. Additionally, the IC design analysis system may not need to be modified to use embodiments described herein.

Figure 9:
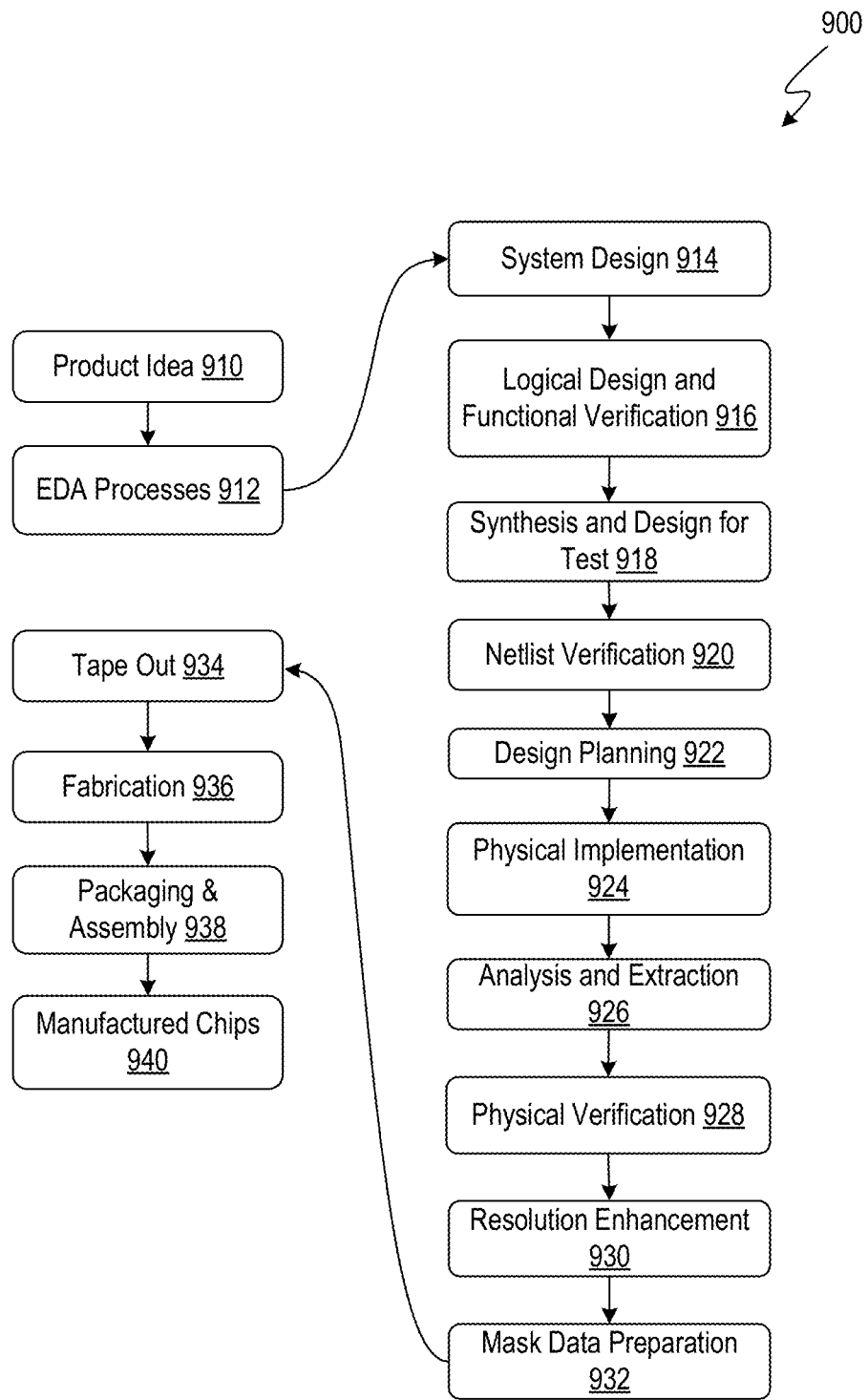
FIG. 9 illustrates an example flow for the design, verification, and fabrication of an IC in accordance with some embodiments described herein.

FIG. 9 illustrates an example flow 900 for the design, verification, and fabrication of an IC in accordance with some embodiments described herein. EDA processes 912 (the acronym "EDA" refers to "Electronic Design Automation") can be used to transform and verify design data and instructions that represent the integrated circuit. Each of these processes can be structured and enabled as multiple modules or operations.

Flow 900 can start with the creation of a product idea 910 with information supplied by a designer, information which is transformed and verified by using EDA processes 912. When the design is finalized, the design is taped-out 934, which is when artwork (e.g., geometric patterns) for the integrated circuit is sent to a fabrication facility to manufacture the mask set, which is then used to manufacture the integrated circuit. After tape-out, a semiconductor die is fabricated 936 and packaging and assembly 938 are performed to produce the manufactured IC chip 940.

Specifications for a circuit or electronic structure may range from low-level transistor material layouts to high-level description languages. A high-level of representation may be used to design circuits and systems, using a hardware description language ("HDL") such as VHDL, Verilog, SystemVerilog, SystemC, MyHDL or OpenVera. The HDL description can be transformed to a logic-level register transfer level ("RTL") description, a gate-level description, a layout-level description, or a mask-level description. Each lower representation level that is a more concrete description adds more detail into the design description. The lower levels of representation that are more concrete descriptions can be generated by a computer, derived from a design library, or created by another design automation process. An example of a specification language at a lower level of representation language for specifying more detailed descriptions is SPICE (which stands for "Simulation Program with Integrated Circuit Emphasis"). Descriptions at each level of representation contain details that are sufficient for use by the corresponding tools of that layer (e.g., a formal verification tool).

During system design 914, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

Some embodiments described herein may be used during logic design and functional verification 916. During logic design and functional verification 916, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 918, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 920, the netlist is checked for compliance with timing constraints and for correspondence with the HDL code. During design planning 922, an overall floor plan for the integrated circuit is constructed and analyzed for timing and top-level routing.

During layout or physical implementation 924, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 926, the circuit function is verified at the layout level, which permits refinement of the layout design. During physical verification 928, the layout design is checked to ensure that manufacturing constraints are correct, such as DRC constraints, electrical constraints, lithographic constraints, and that circuitry function matches the HDL design specification. During resolution enhancement 930, the geometry of the layout is transformed to improve how the circuit design is manufactured.

During tape-out, data is created to be used (after lithographic enhancements are applied if appropriate) for production of lithography masks. During mask data preparation 932, the 'tape-out' data is used to produce lithography masks that are used to produce finished integrated circuits.

A storage subsystem of a computer system (such as computer system 1000 of FIG. 10) may be used to store the programs and data structures that are used by some or all of the EDA products described herein, and products used for development of cells for the library and for physical and logical design that use the library.

Figure 10:
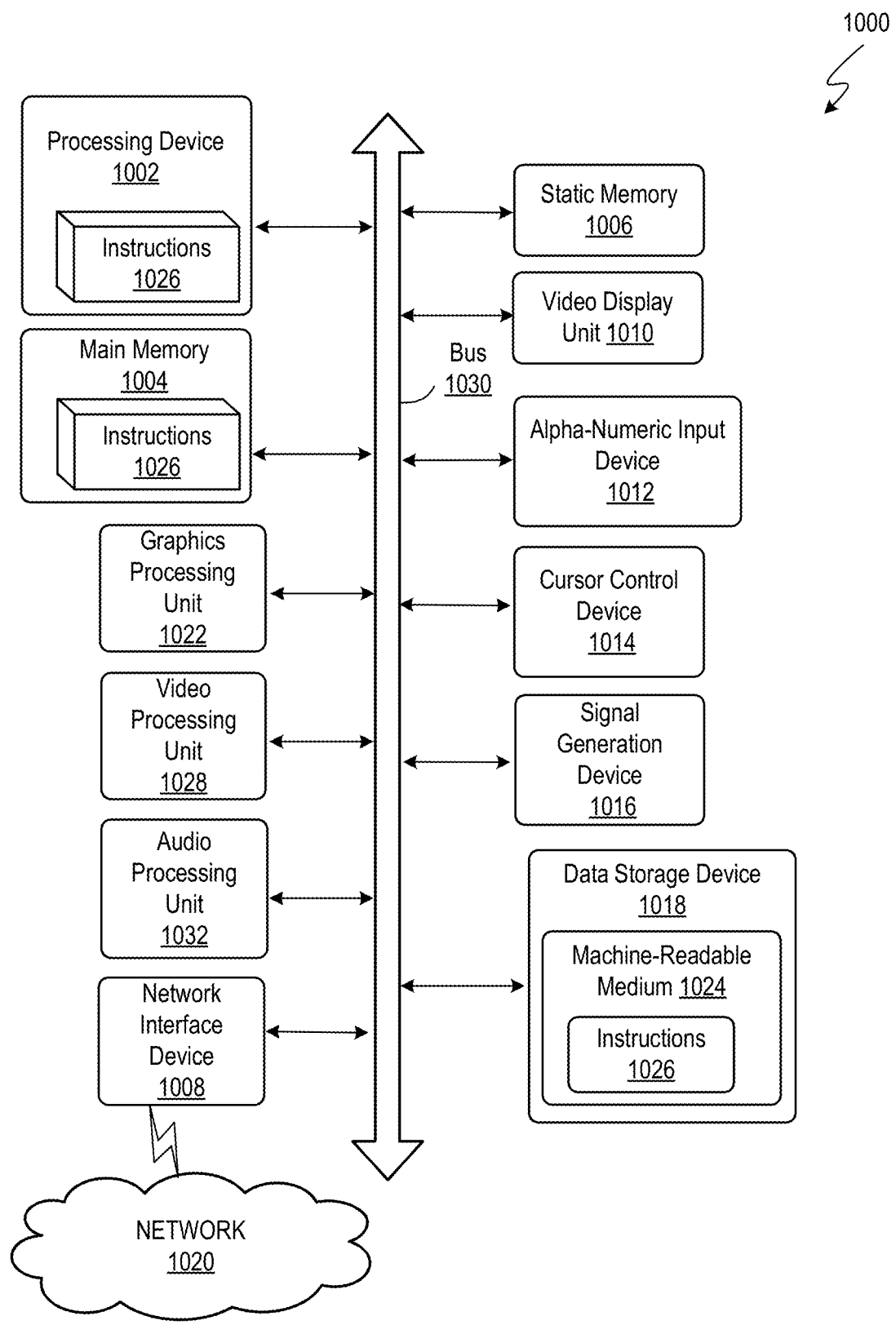
FIG. 10 illustrates an example machine of a computer system within which a set of instructions, for causing the machine to perform any one or more of the methodologies discussed herein, may be executed in accordance with some embodiments disclosed herein.

FIG. 10 illustrates an example machine of a computer system 1000 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 1000 includes a processing device 1002, a main memory 1004 (e.g., read-only memory (ROM), flash memory, dynamic random access memory (DRAM) such as synchronous DRAM (SDRAM), a static memory 1006 (e.g., flash memory, static random access memory (SRAM), etc.), and a data storage device 1018, which communicate with each other via a bus 1030.

Processing device 1002 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 1002 may also be one or more special-purpose processing devices such as an application specific integrated circuit (ASIC), a field programmable gate array (FPGA), a digital signal processor (DSP), network processor, or the like. The processing device 1002 may be configured to execute instructions 1026 for performing the operations and steps described herein.

The computer system 1000 may further include a network interface device 1008 to communicate over the network 1020. The computer system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse), a graphics processing unit 1022, a signal generation device 1016 (e.g., a speaker), graphics processing unit 1022, video processing unit 1028, and audio processing unit 1032.

The data storage device 1018 may include a machine-readable storage medium 1024 (also known as a non-transitory computer-readable medium) on which is stored one or more sets of instructions 1026 or software embodying any one or more of the methodologies or functions described herein. The instructions 1026 may also reside, completely or at least partially, within the main memory 1004 and/or within the processing device 1002 during execution thereof by the computer system 1000, the main memory 1004 and the processing device 1002 also constituting machine-readable storage media.

In some implementations, the instructions 1026 include instructions to implement functionality corresponding to the present disclosure. While the machine-readable storage medium 1024 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 1002 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

What is claimed is:

1. A method, comprising:
    loading a word-level design model representing an integrated circuit (IC) design into a memory;
    creating, by a processor, a set of masking layers, wherein each masking layer in the set of masking layers includes objects in the word-level design model that are not used by a corresponding IC design analysis system in a set of IC design analysis systems; and
    using a respective masking layer in the set of masking layers to provide a respective reduced block model view on-the-fly to a respective IC design analysis system.

2. The method of claim 1, wherein using the respective masking layer to provide the respective reduced block model view on-the-fly to the respective IC design analysis system comprises:
    receiving a request for connectivity information in the word-level design model from the respective IC design analysis system;
    determining the connectivity information based on the word-level design model and the respective masking layer; and
    providing the connectivity information to the respective IC design analysis system.

3. The method of claim 1, wherein creating the respective masking layer which includes objects in the word-level design model that are not used by the respective IC design analysis system comprises:
    identifying a subset of objects in the word-level design model by performing word-level traversals from input and output ports; and
    adding objects that are not in the subset of objects to the respective masking layer.

4. The method of claim 3, wherein identifying the subset of objects in the word-level design model by performing word-level traversals from input and output ports comprises identifying objects in a path from a port to a first level sequential register.

5. The method of claim 3, wherein identifying the subset of objects in the word-level design model by performing word-level traversals from input and output ports comprises:
    selecting a first port connected to a first clock domain crossing (CDC) synchronization circuit;
    selecting a second port connected to a second CDC synchronization circuit; and
    identifying objects in a first path from the first port and a second path from the second port that converge at a sequential register.

6. The method of claim 3, wherein identifying the subset of objects in the word-level design model by performing word-level traversals from input and output ports comprises:
    identifying objects in different blocks of the word-level design model in parallel; and
    aggregating the objects identified in the different blocks of the word-level design model to obtain the subset of objects.

7. The method of claim 6, wherein the IC design is a system on a chip (SoC) design, wherein the respective reduced block model view corresponds to a top-level view in the SoC design, and wherein the different blocks of the word-level design model correspond to different blocks in the top-level view of the SoC design.

8. The method of claim 1, wherein the set of IC design analysis systems includes a clock-domain-crossing (CDC) analysis system, a reset-domain-crossing (RDC) analysis system, a low-power (LP) analysis system, or a structural analysis system.

9. A non-transitory computer readable storage medium storing instructions, which when executed by a processor, cause the processor to:
    load a word-level design model representing an integrated circuit (IC) design into a memory;
    create a masking layer which includes objects in the word-level design model that are not used by an IC design analysis system, wherein the IC design analysis system is a reset-domain-crossing (RDC) analysis system or a low-power (LP) analysis system, wherein creating the masking layer which includes objects in the word-level design model that are not used by the IC design analysis system comprises:
identifying a subset of objects in the word-level design model by performing word-level traversals from input and output ports; and
adding objects that are not in the subset of objects to the masking layer; and
use the masking layer to provide a reduced block model view on-the-fly to the IC design analysis system.

10. The non-transitory computer readable storage medium of claim 9, wherein using the masking layer to provide the reduced block model view on-the-fly to the IC design analysis system comprises:
receiving a request for connectivity information in the word-level design model from the IC design analysis system;
determining the connectivity information based on the word-level design model and the masking layer; and
providing the connectivity information to the IC design analysis system.

11. The non-transitory computer readable storage medium of claim 9, wherein identifying the subset of objects in the word-level design model by performing word-level traversals from input and output ports comprises identifying objects in a path from a port to a first level sequential register.

12. The non-transitory computer readable storage medium of claim 9, wherein identifying the subset of objects in the word-level design model by performing word-level traversals from input and output ports comprises:
identifying objects in different blocks of the word-level design model in parallel; and
aggregating the objects identified in the different blocks of the word-level design model to obtain the subset of objects.

13. The non-transitory computer readable storage medium of claim 9, wherein creating the masking layer comprises adding a reset signal to the masking layer that does not cross a clock domain boundary.

14. The non-transitory computer readable storage medium of claim 9, wherein creating the masking layer comprises adding logic gates to the masking layer which are not used for determining a power mode of the IC design.

15. An apparatus, comprising:
a memory storing instructions; and
a processor, coupled with the memory and to execute the instructions, the instructions when executed causing the processor to:
load a word-level design model representing an integrated circuit (IC) design into the memory;
create a masking layer which includes objects in the word-level design model that are not used by an IC design analysis system, wherein creating the masking layer comprises:
identifying a subset of objects in the word-level design model by performing word-level traversals from input and output ports, wherein performing word-level traversals includes determining connectivity for multiple bits of a word using a single word-level traversal operation; and
adding objects that are not in the subset of objects to the masking layer;
receive a request for connectivity information in the word-level design model from the IC design analysis system;
determine the connectivity information based on the word-level design model and the masking layer; and
provide the connectivity information to the IC design analysis system.

16. The apparatus of claim 15, wherein identifying the subset of objects in the word-level design model by performing word-level traversals from input and output ports comprises identifying objects in a path from a port to a first level sequential register.

17. The apparatus of claim 15, wherein identifying the subset of objects in the word-level design model by performing word-level traversals from input and output ports comprises:
selecting a first port connected to a first clock domain crossing (CDC) synchronization circuit;
selecting a second port connected to a second CDC synchronization circuit; and
identifying objects in a first path from the first port and a second path from the second port that converge at a sequential register.

18. The apparatus of claim 15, wherein identifying the subset of objects in the word-level design model by performing word-level traversals from input and output ports comprises:
identifying objects in different blocks of the word-level design model in parallel; and
aggregating the objects identified in the different blocks of the word-level design model to obtain the subset of objects.

19. The apparatus of claim 15, wherein the IC design analysis system is a clock-domain-crossing (CDC) analysis system, a reset-domain-crossing (RDC) analysis system, a low-power (LP) analysis system, or a structural analysis system.

* * * * *